(12) United States Patent
Cho et al.

(10) Patent No.: US 10,001,670 B2
(45) Date of Patent: *Jun. 19, 2018

(54) SUPPORTING MEMBER FOR BACKLIGHT UNIT, BACKLIGHT UNIT AND IMAGE DISPLAY APPARATUS HAVING THE SAME

(71) Applicant: SAMSUNG ELECTRONICS CO., LTD., Suwon-si (KR)

(72) Inventors: Byoung-jin Cho, Anyang-si (KR); Young-chol Lee, Hwaseong-si (KR); Hyung-chul Kim, Suwon-si (KR); Heong-seog Lee, Suwon-si (KR); Hyeong-sik Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

This patent is subject to a terminal disclaimer.

(21) Appl. No.: 14/822,307

(22) Filed: Aug. 10, 2015

(65) Prior Publication Data

US 2015/0346552 A1 Dec. 3, 2015

Related U.S. Application Data

(63) Continuation of application No. 13/616,139, filed on Sep. 14, 2012, now Pat. No. 9,128,326.

(Continued)

(30) Foreign Application Priority Data

Mar. 22, 2012 (KR) ........................ 10-2012-0029331

(51) Int. Cl.
*G02F 1/1335* (2006.01)
*F21V 21/00* (2006.01)

(52) U.S. Cl.
CPC ........ *G02F 1/133608* (2013.01); *F21V 21/00* (2013.01); *G02F 1/133603* (2013.01);
(Continued)

(58) Field of Classification Search
CPC ......... G02F 1/133603; G02F 1/133608; G02F 1/602; G02F 1/604
See application file for complete search history.

(56) References Cited

U.S. PATENT DOCUMENTS 7,101,074 B2   9/2006   Kuo et al.
8,430,554 B2   4/2013   Hasegawa
(Continued)

FOREIGN PATENT DOCUMENTS

CN   102159883 A      8/2011
CN   201954497   *   8/2011   ............ F21V 21/108
(Continued)

OTHER PUBLICATIONS

English Machine Translation of JP2010-218915 and KR20080038879 from Espacenet.*
(Continued)

*Primary Examiner* — Jong-Suk James Lee
*Assistant Examiner* — Zheng Song
(74) *Attorney, Agent, or Firm* — Sughrue Mion, PLLC (57) ABSTRACT

A supporting member usable with a backlight unit of an image display apparatus includes a supporting portion that is formed of a transparent material, disposed below a diffuser plate to support the diffuser plate, and includes a first end being in contact with the diffuser plate and two flat side surfaces disposed in parallel to one another and connected to one another at the first end; a base that is formed at a second end of the supporting portion and fixes the supporting (Continued)

portion to an under chassis of the backlight unit; and a reinforcing portion that is disposed on a top surface of the base.

13 Claims, 11 Drawing Sheets

Related U.S. Application Data (60) Provisional application No. 61/595,904, filed on Feb. 7, 2012.

(52) U.S. Cl.
CPC .. *G02F 1/133602* (2013.01); *G02F 1/133604* (2013.01); *G02F 2201/46* (2013.01); *G02F 2201/465* (2013.01); *G02F 2201/54* (2013.01)

(56) References Cited

U.S. PATENT DOCUMENTS

| | | |
|---|---|---|
| 2004/0257792 A1 | 12/2004 | Yu et al. |
| 2005/0162869 A1 | 7/2005 | Kanatsu |
| 2005/0219431 A1 | 10/2005 | Chang et al. |
| 2006/0018130 A1 | 1/2006 | Lee |
| 2006/0104080 A1 | 5/2006 | Kim et al. |
| 2006/0171140 A1 | 8/2006 | Bae |
| 2007/0103908 A1 | 5/2007 | Tabito et al. |
| 2008/0037288 A1 | 2/2008 | Kim |
| 2008/0111937 A1 | 5/2008 | Chen |
| 2008/0111949 A1 | 5/2008 | Shibata et al. |
| 2009/0268126 A1 | 10/2009 | Son et al. |
| 2011/0187945 A1 | 8/2011 | Kuromizu |
| 2011/0199754 A1 | 8/2011 | Hasegawa |
| 2011/0317095 A1 | 12/2011 | Shimizu |
| 2012/0013824 A1 | 1/2012 | Yoshikawa |
| 2013/0194529 A1 | 8/2013 | Chang et al. |
| 2014/0009909 A1 | 1/2014 | Shima et al. |
| 2014/0211123 A1 | 7/2014 | Lee et al. |
| 2015/0049508 A1 | 2/2015 | Suzuki et al. |
| 2015/0055052 A1 | 2/2015 | Tanabe |

FOREIGN PATENT DOCUMENTS

| | | | | |
|---|---|---|---|---|
| CN | 201954497 U | | 8/2011 | |
| EP | 1 881 363 A1 | | 1/2008 | |
| EP | 2 343 478 A1 | | 7/2011 | |
| JP | 10-326517 A | | 12/1998 | |
| JP | 2005-316337 A | | 11/2005 | |
| JP | 2006-210337 A | | 8/2006 | |
| JP | 2010218915 | * | 3/2009 | ............... F21S 2/00 |
| JP | 2009-193972 A | | 8/2009 | |
| JP | 201 0-21 891 5 A | | 9/2010 | |
| KR | 20080038879 | * | 1/2006 | ....... G02F 1/133603 |
| KR | 10-2006-0044015 A | | 5/2006 | |
| KR | 10-2008-0038879 A | | 5/2008 | |
| KR | 10-0834892 B1 | | 6/2008 | |
| WO | 2010/052957 A1 | | 5/2010 | |

OTHER PUBLICATIONS

English Machine Translation of CN 201954497 from Espacenet.*
Communication dated Jan. 14, 2014 issued by the Japanese Patent Office in counterpart Japanese Patent Application No. 2013-021102.
Communication from the State Intellectual Property Office of P.R. China dated Feb. 2, 2015 in a counterpart application No. 201310005677.X.
Communication, dated May 31, 2013, issued by the Korean Intellectual Property Office in counterpart Korean Patent Application No. 10-2012-0029331.
Communication, dated May 6, 2013, issued by the European Patent Office in counterpart European Patent Application No. 12189056.0.
Communication, Issued by the Chinese Patent Office, dated Jun. 20, 2014, in Counterpart Chinese Application No. 201310005677.X.
Communication, Issued by the European Patent Office, dated Jul. 18, 2014, in Counterpart European Application No. 12 189 056.0.
International Search Report (PCT/ISA/210), dated May 29, 2013, issued by the International Searching Authority in counterpart International Patent Application No. PCT/KR2013/000884.
Written Opinion (PCT/ISA/237), dated May 29, 2013, issued by the International Searching Authority in counterpart International Patent Application No. PCT/KR2013/000884.

* cited by examiner

SUPPORTING MEMBER FOR BACKLIGHT UNIT, BACKLIGHT UNIT AND IMAGE DISPLAY APPARATUS HAVING THE SAME

CROSS-REFERENCE TO RELATED APPLICATIONS

This application is a continuation of U.S. application Ser. No. 13/616,139 filed Sep. 14, 2012, which claims benefit of U.S. Provisional Application No. 61/595,904, filed Feb. 7, 2012, and claims priority from Korean Patent Application No. 10-2012-0029331, filed Mar. 22, 2012, in the Korean Intellectual Property Office, the disclosures of which are incorporated herein by reference in their entireties.

BACKGROUND

1. Field

Apparatuses and methods consistent with exemplary embodiments relate to a backlight unit usable with a flat image display apparatus, and, more particularly, to a supporting member for a backlight unit supporting a diffuser plate in the backlight unit usable with a flat image display apparatus.

2. Description of the Related Art

A liquid crystal display apparatus is an image display apparatus using liquid crystals to display images and is used for various display apparatuses such as a television (TV), a computer monitor, etc.

The liquid crystal display apparatus includes a liquid crystal panel assembly, which includes a backlight unit and a liquid crystal panel. The backlight unit is disposed behind the liquid crystal panel.

The backlight unit may be an edge-lit backlight unit which includes light sources disposed on a side of the liquid crystal panel and needs a light guide plate, and a direct-lit backlight unit which includes light sources disposed below the liquid crystal panel and does not need the light guide plate.

Figure 1A:
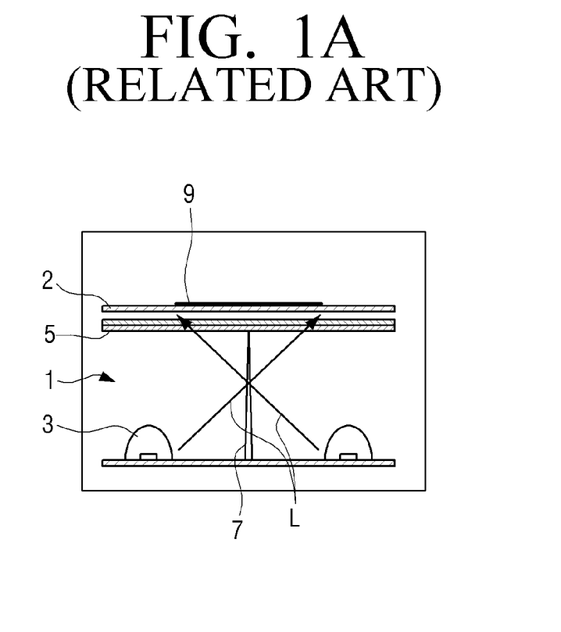
FIGS. 1A and 1B illustrate a shadow formed by a supporting member in a related art backlight unit.
Figure 1B:
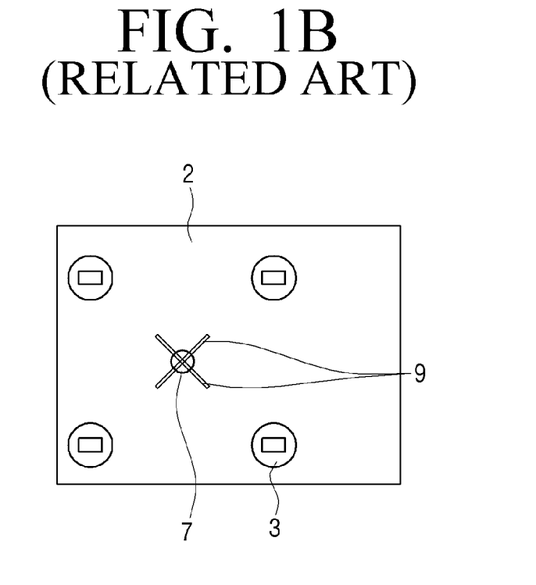

As shown in FIGS. 1A and 1B, the direct-lit backlight unit 1 has the light sources 3, which are disposed below the liquid crystal panel, and a supporting member 7 to prevent a diffuser plate 5 and optical sheets from sagging.

For reducing the manufacturing cost of the image display apparatus using the direct-lit backlight unit, the number of the light sources may be decreased and the thickness of the diffuser plate may be increased. However, if the number of the light sources 3 of the related art direct-lit backlight unit 1 is decreased and the thickness of the diffuser plate 5 is increased, the shadows 9 of the related art supporting member 7 may appear on a screen 2 due to light L emitted from the light sources 3.

Therefore, there is a need for a support structure which does not project the shadows on the screen, in the image display apparatus using the direct-lit backlight unit, even when the number of the light sources is decreased and the thickness of the diffuser plate is increased.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

One or more exemplary embodiments relate to a supporting member usable with a backlight unit a shadow of which does not appear on a screen of an image display apparatus using a direct-lit backlight unit, and a backlight unit and an image display apparatus having the same.

According to an aspect of an exemplary embodiment, there is provided a supporting member usable with a backlight unit which supports a diffuser plate of the backlight unit for an image display apparatus, which may include a supporting portion that is formed of a transparent material, is disposed below the diffuser plate to support the diffuser plate, and has a first end being in contact with the diffuser plate; and a base that is formed at a second end of the supporting portion and fixes the supporting portion to an under chassis of the backlight unit.

The supporting portion may be formed as a flat plate shape and a width of the first end is narrower than that of the second end.

Opposite side surfaces connecting the first end and the second end of the supporting portion may be formed as at least one shape among a straight line, a concave curve, a convex curve, and a step shape.

The first end of the supporting portion may be in point contact with the diffuser plate.

An area of the first end of the supporting portion in contact with the diffuser plate may be smaller than 4 mm$^2$.

A thickness of the supporting portion may be smaller than 2 mm.

The supporting member may include a reinforcing portion that is disposed on a top surface of the base and formed to support at least one between a front surface and a rear surface of the supporting portion.

The reinforcing portion may be formed to support both the front surface and the rear surface of the supporting portion.

The base and the reinforcing portion may be formed of the same transparent material as the supporting member.

The base may include a fixing protrusion inserted into a fixing hole formed on the under chassis of the backlight unit.

The base may be formed perpendicular to the supporting portion and includes at least two reference surfaces that have different distances to the first end of the supporting portion.

According to another aspect of an exemplary embodiment, there is provided a backlight unit including a diffuser plate; a fixing member fixing the diffuser plate; an under chassis spaced apart from the diffuser plate; a plurality of light sources disposed on a top surface of the under chassis and to emit light to the diffuser plate; and at least one supporting member disposed between the plurality of light sources on the top surface of the under chassis and supporting the diffuser plate and having the above described features.

The supporting member may be disposed at a center of nearest light sources among the plurality of light sources.

BRIEF DESCRIPTION OF THE DRAWINGS

The above and/or other aspects will become more apparent by describing certain exemplary embodiments, with reference to the accompanying drawings, in which.

DETAILED DESCRIPTION OF EXEMPLARY EMBODIMENTS

Hereinafter, certain exemplary embodiments are described in greater detail below with reference to the accompanying drawings.

In the following description, like drawing reference numerals are used for the like elements, even in different drawings. The matters defined herein, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail. Further, dimensions of various elements in the accompanying drawings may be arbitrarily increased or decreased for assisting in a comprehensive understanding.

Figure 2:
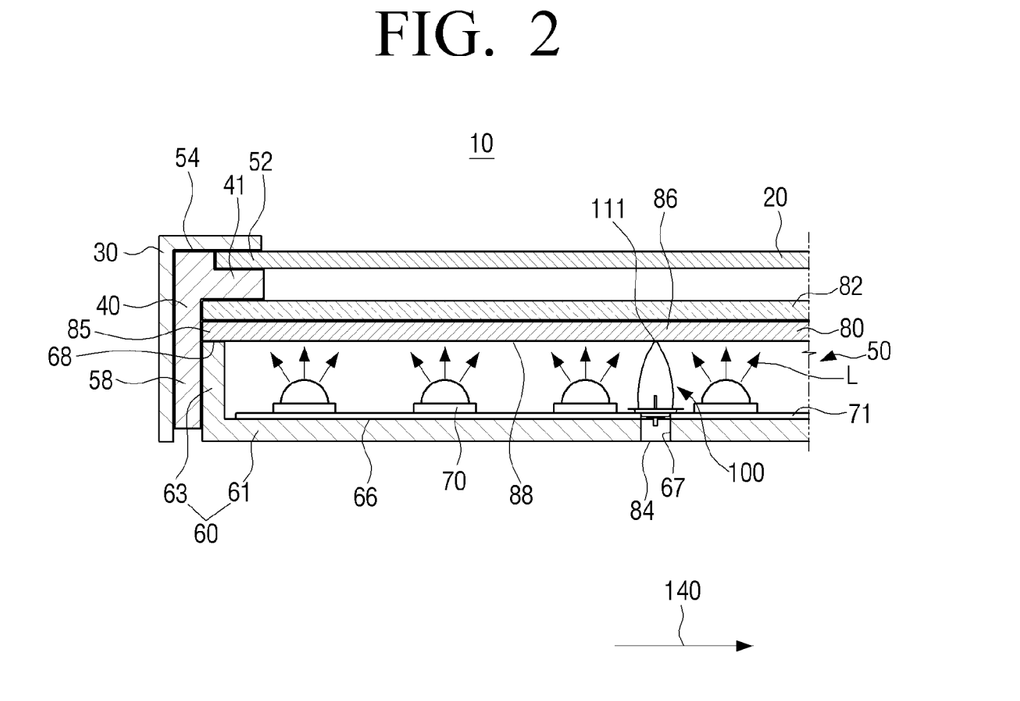
FIG. 2 is a partial sectional view illustrating a liquid crystal panel assembly including a supporting member according to an exemplary embodiment.

FIG. 2 is a partially sectional view illustrating a liquid crystal panel assembly including a supporting member according to an exemplary embodiment.

Referring to FIG. 2, a liquid crystal panel assembly 10 according to an exemplary embodiment may include a liquid crystal panel 20, an upper chassis 30, a middle mold 40, and a backlight unit 50.

The liquid crystal panel 20 displays color images by using light L provided by the backlight unit 50. The liquid crystal panel 20 includes a color filter board (not illustrated) having a color filter layer and a thin film transistor board (not illustrated) having thin film transistors. A liquid crystal (not illustrated) is received between the color filter board and the thin film transistor board. The liquid crystal panel 20 can use a related art liquid crystal panel; therefore, a detail explanation thereof will be omitted.

The upper chassis 30 and the middle mold 40 fix and support the liquid crystal panel 20. The middle mold 40 may be formed in a substantially rectangular hollow frame shape. A protruding portion 41 supporting an edge portion 52 of the liquid crystal panel 20 is formed on a side surface of the middle mold 40. The upper chassis 30 is disposed on a top side 54 of the middle mold 40 and is formed substantially in the shape of the letter "L" to fix the edge portion 52 of the liquid crystal panel 20 positioned on the protruding portion 41 of the middle mold 40.

The backlight unit 50 is disposed in a lower portion 58 of the middle mold 40 and supplies light L to the liquid crystal panel 20. The backlight unit 50 may include an under chassis 60, a plurality of light sources 70, a diffuser plate 80, an optical sheet 82, and at least one supporting member 100.

The under chassis 60 supports the diffuser plate 80 and is formed to have a space in which the plurality of light sources 70 are disposed. Accordingly, the under chassis 60 includes a bottom portion 61 and a side portion 63 extending upwardly from the entire circumference of the bottom portion 61. In other words, the under chassis 60 is formed as a container shape having the bottom portion 61 of the size and shape corresponding to the liquid crystal panel 20. A reflection sheet reflecting light L emitted from the plurality of light sources 70 may be disposed on the bottom portion 61 of the under chassis 60. Also, at least one fixing hole 67 in which the at least one supporting member 100 is disposed is formed on the bottom portion 61 of the under chassis 60. The top end 68 of the side portion 63 of the under chassis 60 is, as illustrated in FIG. 2, formed to support the diffuser plate 80. The side portion 63 of the under chassis 60 is fixed to the lower portion of the middle mold 40 by securing members (not illustrated) such as screws, bolts, etc. Accordingly, if the under chassis 60 is fixed to the middle mold 40, the diffuser plate 80 is fixed between the top end 68 of the side portion 63 of the under chassis 60 and the protruding portion 41 of the middle mold 40.

Figure 11:
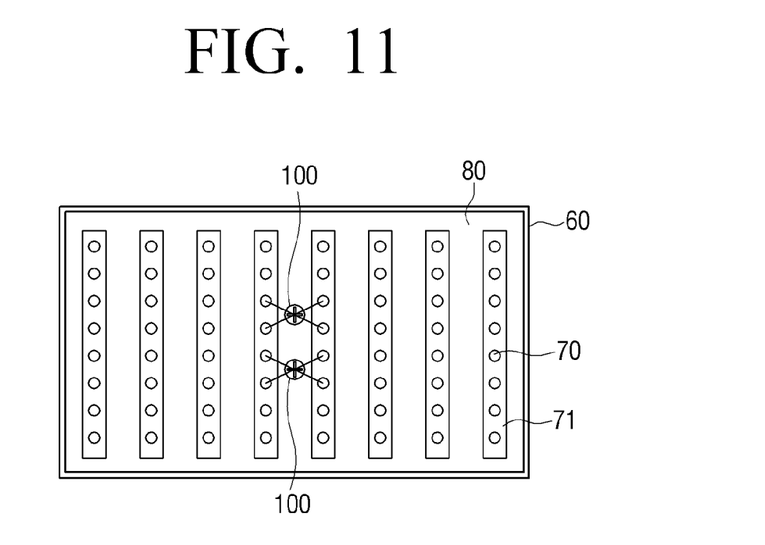
FIG. 11 is a view illustrating a location where a supporting member according to an exemplary embodiment is disposed in a backlight unit.

The plurality of light sources 70 are disposed on or proximate to a top surface 66 of the bottom portion 61 of the under chassis 60. Accordingly, the plurality of light sources 70 are disposed directly below the liquid crystal panel 20 and emit light L to the liquid crystal panel 20. Light emitting diodes LEDs can be used as the light sources 70. The plurality of light sources 70 are disposed on a printed circuit board 71. The printed circuit board 71 may be formed as a single board having the size and shape corresponding to the bottom portion 61 of the under chassis 60. Alternatively, as illustrated in FIG. 11, the printed circuit board 71 may be formed as a plurality of bar shaped printed circuit boards. For example, the plurality of bar shaped printed circuit boards 71 are arranged at regular intervals on the bottom portion 61 of the under chassis 60 to correspond to the size of the liquid crystal panel 20. The number of the light sources 70 disposed on the bar shaped printed circuit board 71 and the number of the bar shaped printed circuit boards 71 disposed on the bottom portion 61 of the under chassis 60 are properly determined according to the size of the liquid crystal panel 20.

The diffuser plate 80 supports the optical sheet 82 and uniformly diffuses light L emitting from the plurality of light sources 70. The optical sheet 82 optically converts the light having passed through the diffuser plate 80 and then supplies the light to the liquid crystal panel 20. The diffuser plate 80 and the optical sheet 82 are the same as or similar to those of the related art direct-lit backlight unit. Therefore, detailed explanations thereof will be omitted.

The supporting member 100 is disposed between the diffuser plate 80 and the under chassis 60 to support the diffuser plate 80. Since only an edge portion 85 of the diffuser plate 80 is supported by the side portion 63 of the under chassis 60, the middle portion 86 of the diffuser plate 80 may sag down. The bigger the size of the screen of the image display apparatus 200 is, the greater the sag of diffuser plate 80 is. Accordingly, the supporting member 100 may be disposed approximately at the center area 84 of the under chassis 60 to support the middle portion 86 of the diffuser plate 80. FIG. 11 illustrates a state that the two supporting members 100 are disposed at an approximately center portion of the under chassis 60. In FIG. 11, that two supporting members 100 are disposed on the under chassis 60 is only one example; therefore, this does not limit the number of the supporting members 100. One or more of the supporting members 100 may be disposed corresponding to the size and weight of the diffuser plate 80.

Figure 3:
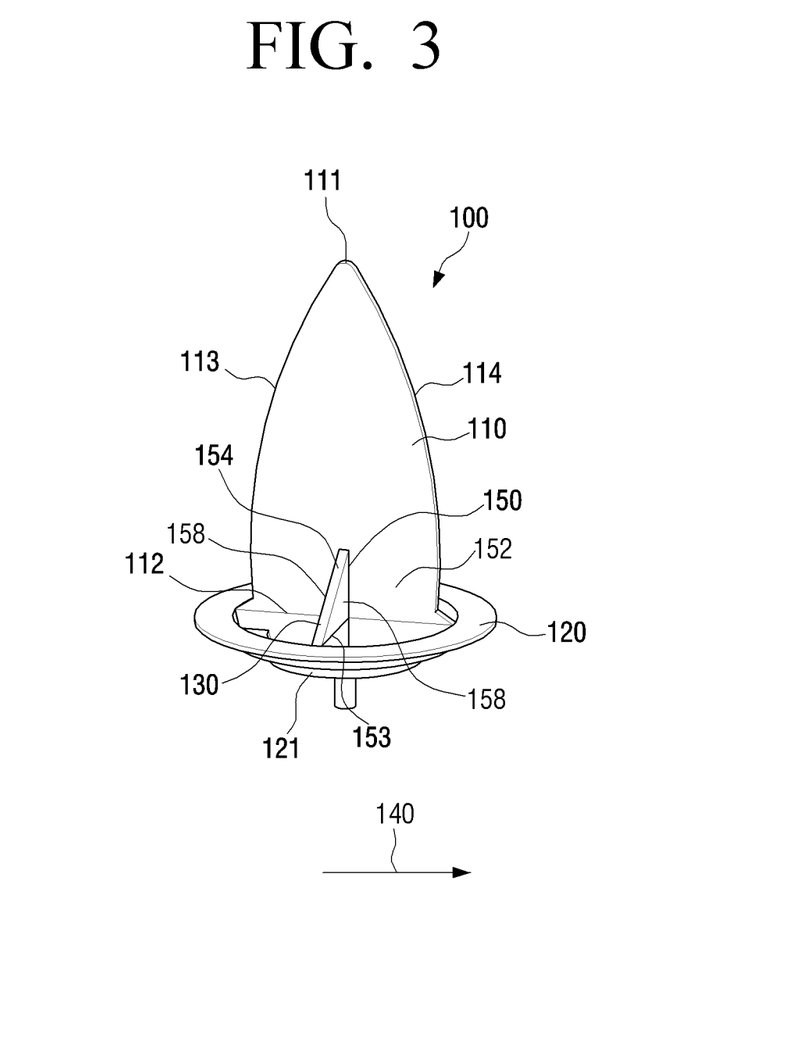
FIG. 3 is a perspective view illustrating a supporting member according to an exemplary embodiment.
Figure 4:
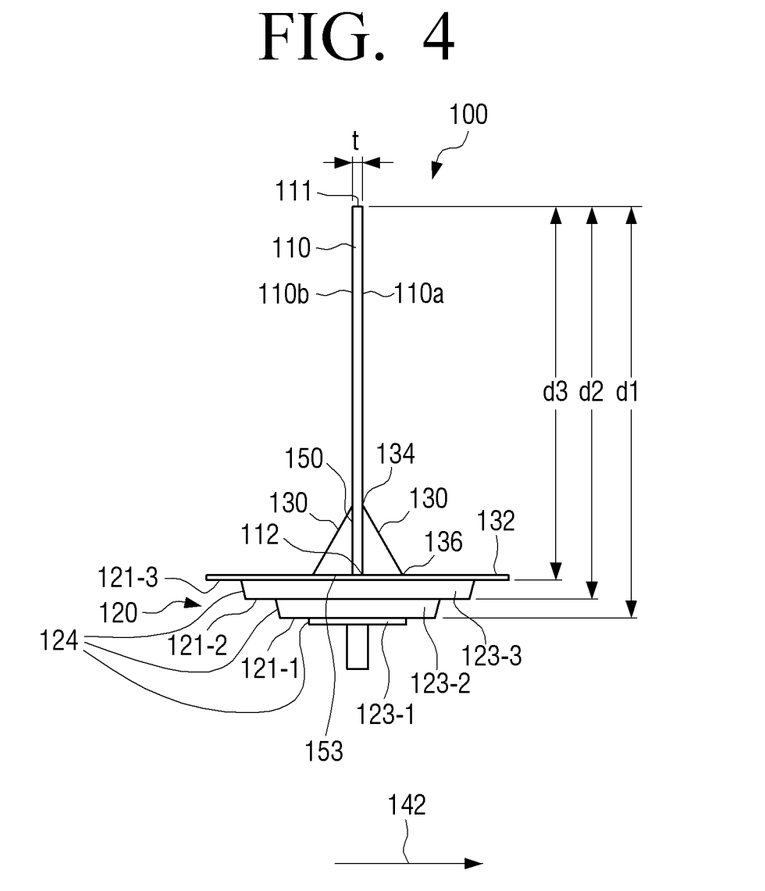
FIG. 4 is a side view illustrating the supporting member according to an exemplary.
Figure 5:
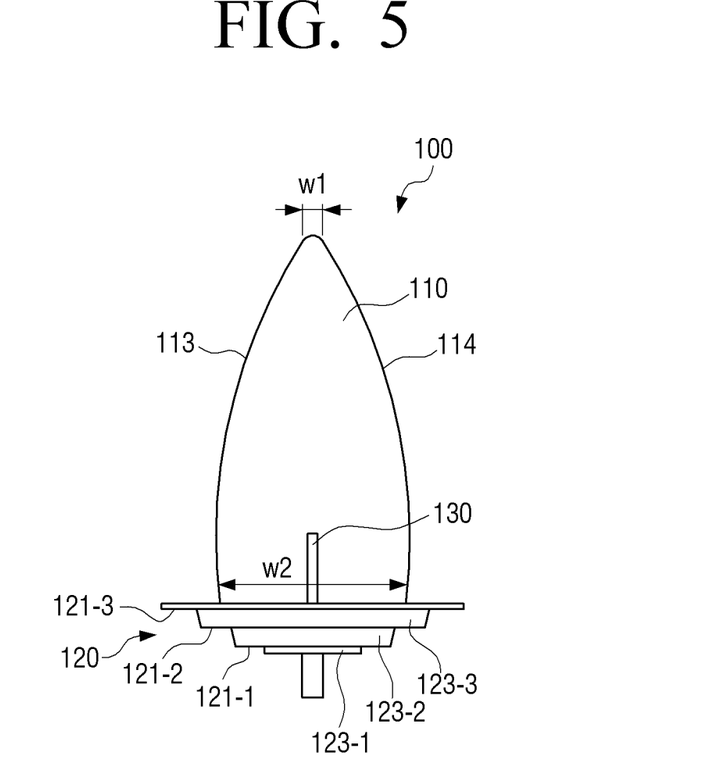
FIG. 5 is a front view illustrating the supporting member according to an exemplary.

The supporting member 100 according to an exemplary embodiment may be formed as a flat plate shape having a thin thickness t. FIGS. 3, 4 and 5 illustrate the supporting member 100 according to an exemplary embodiment. FIG. 3 is a perspective view illustrating the supporting member 100 according to an exemplary embodiment. FIG. 4 is a side view illustrating the supporting member 100 of FIG. 3, and FIG. 5 is a front view illustrating the supporting member 100 of FIG. 3.

Referring to FIGS. 3, 4 and 5, the supporting member 100 according to an exemplary embodiment includes a supporting portion 110, a base 120, and a reinforcing portion 130.

The supporting portion 110 is formed of a transparent material in a flat plate shape. The supporting portion 110 can use various materials as long as it is transparent and can support the weight of the diffuser plate 80. For example, the supporting portion 110 may be formed of a transparent plastic or a transparent resin.

The supporting portion 110 is disposed below the diffuser plate 80, that is, on the bottom portion 61 of the under chassis 60 and supports the diffuser plate 80. A first end 111 of the supporting portion 110 is in contact with the bottom surface 88 of the diffuser plate 80 and a second end 112 thereof is connected to the base 120, along a first direction 140. Although illustrated to extend in the first direction 140 coinciding with an elongated dimension of the screen 20, the second end 112 may be connected to the base 120 in a different orientation and/or direction.

The supporting portion 110 may be formed as a flat plate shape as thin as possible in order to prevent a shadow from being formed by the light L emitted from the plurality of light sources 70 arranged around the supporting member 100. Here, the flat plate shape refers to a plate shape having a front surface and a rear surface which are substantially parallel to each other and substantially flat. Accordingly, as long as the supporting member 100 can support the weight of the diffuser plate 80, the supporting portion 110 may be formed as thin as possible. For example, the supporting portion 110 may be formed to have a thickness t of 0.5 mm to 2 mm, in a second direction 142 which is substantially perpendicular to the first direction 140. If the supporting member 100 is made of a material with a sufficiently large strength, the supporting member 100 may be formed to have the thickness t less than 0.5 mm.

Further, in order to minimize interference of light L emitted from the light sources 70 around the supporting member 100, the supporting portion 110 may be formed as a flat plate shape having a width W1 of the first end 111 thereof narrower than a width W2 of the second end 112 thereof. Accordingly, the first end 111 of the supporting portion 110 may be formed to have an area as small as possible. For this, the first end 111 of the supporting portion 110 may be formed to be in point contact with the diffuser plate 80. For example, the first end 111 of the supporting portion 110 may be formed to have an area of less than 4 mm². For example, if the thickness t of the supporting portion 110 is 2 mm, the first end 111 of the supporting portion 110 may be formed as a square cross-section having four sides of 2 mm. Alternatively, the first end 111 of the supporting portion 110 may be formed as a circular cross-section having a radius of 2 mm. The width W2 of the second end 112 of the supporting portion 110 may be formed 10 times or 20 times larger than the width W1 of the first end 111. For example, if the width W1 of the first end 111 of the supporting portion 110 is 2 mm, the width W2 of the second end 112 of the supporting portion 110 may be from approximately 10 mm to approximately 20 mm. However, this is only one example. The second end 112 of the supporting portion 110 may be formed to have various sizes of width W2 as long as the second end 112 can support the diffuser plate 80.

Opposite side surfaces 113, 114 of the supporting portion 110 connecting the first end 111 and the second end 112 of the supporting portion 110 may be formed in various shapes. In other words, the supporting portion 110 may be formed in various shapes as long as the front surface 110a and the rear surface 110b of the supporting portion 110 are a flat plate shape and substantially parallel with each other, a top end or the first end 111 thereof is narrow and a bottom end or the second end 112 thereof is wide, and the opposite side surfaces 113, 114 thereof can connect the top end 111 and the bottom end 112 thereof. For example, the opposite side surfaces 113, 114 of the supporting portion 110 may be formed as a straight line, a concave curve, a convex curve, a step shape, etc. The opposite side surfaces 113, 114 of the supporting portion 110 of the supporting member 100 as illustrated in FIGS. 3, 4 and 5 are formed as convex curves.

Figure 6A:
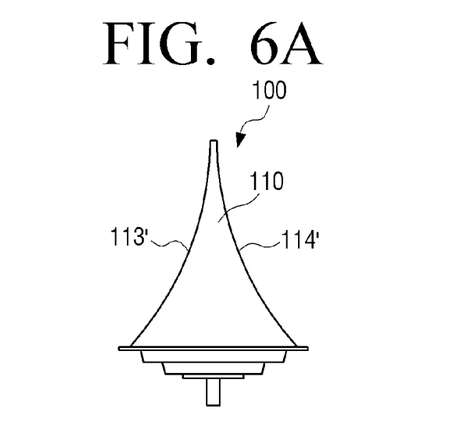
FIGS. 6A, 6B, and 6C are examples of a supporting member according to an exemplary embodiment.

FIG. 6A illustrates the opposite side surfaces 113' and 114' of the supporting portion 110 formed as a concave curve.

Figure 6B:
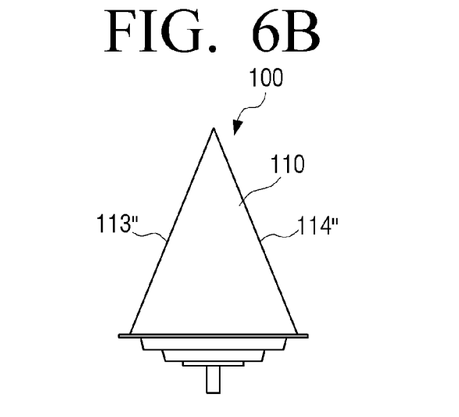

FIG. 6B illustrates the opposite side surfaces 113" and 114" of the supporting portion 110 formed as a straight line.

Figure 6C:
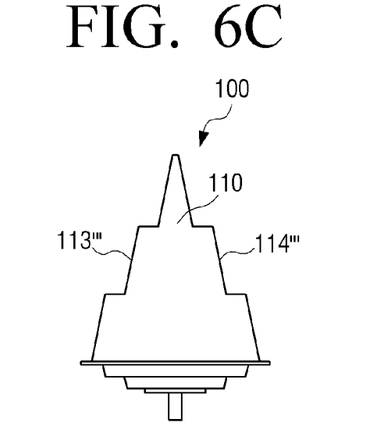

FIG. 6C illustrates the opposite side surfaces 113" and 114" of the supporting portion 110 formed as a step shape.

The base 120 is formed on the second end 112 of the supporting portion 110 and fixes the supporting portion 110 to the backlight unit 50, that is, the under chassis 60. The base 120 is formed substantially perpendicular to the supporting portion 110 so that the supporting portion 110 is substantially perpendicular to the bottom portion 61 of the under chassis 60. The base 120 can be formed to have various cross-sections such as a circle, a rectangular, a square, etc.; however, in the present exemplary embodiment, as illustrated in FIG. 3, the base 120 is formed to have a circular cross-section.

Referring to FIGS. 4 and 5, the base 120 may include reference surfaces 121-1, 121-2, and 121-3 and fixing protrusions 123-1, 123-2, and 123-3. The reference surfaces 121-1, 121-2, and 121-3 are formed substantially perpendicular to the supporting portion 110 and in contact with the bottom portion 61 of the under chassis 60. The fixing protrusions 123-1, 123-2, and 123-3 are formed substantially perpendicular to the reference surfaces 121-1, 121-2, and 121-3 and inserted into the fixing hole 67 formed on the under chassis 60. For example, at least one of the fixing protrusions 123-1, 123-2, and 123-3 may be formed to have a side surface 124 with a downward slope. After the fixing protrusions 123-1, 123-2, and 123-3 are inserted into the fixing hole 67, one of the reference surfaces 121-1, 121-2, and 121-3 is in contact with the top surface 66 of the bottom portion 61 of the under chassis 60 so that the supporting portion 110 is fixed substantially perpendicular to the top surface 66 of the bottom portion 61 of the under chassis 60.

Figure 7:
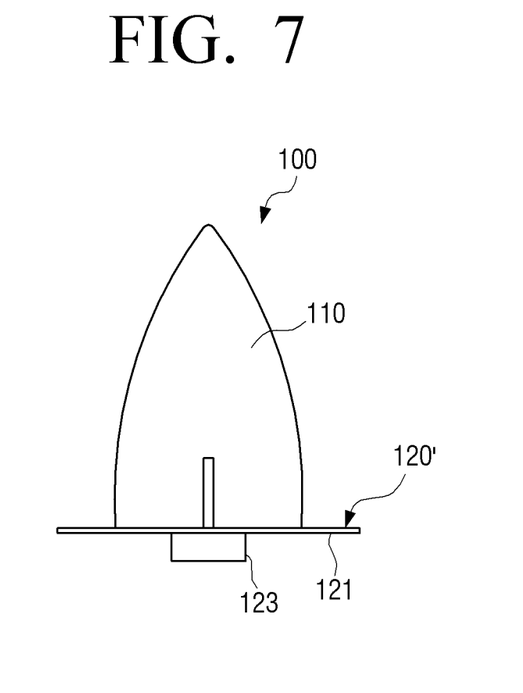
FIG. 7 is a front view illustrating a supporting member according to another exemplary embodiment.

The base 120' may be formed to include one fixing protrusion 123 and one reference surface 121 as illustrated in FIG. 7. Alternatively, in an exemplary embodiment, the base 120 may be formed to have multiple reference surfaces 121-1, 121-2, and 121-3 so that the base 120 can be used in various types of backlight units 50 usable with various standards of liquid crystal panel assemblies 10. In other words, as illustrated in FIG. 4, the base 120 may have three reference surfaces 121-1, 121-2, and 121-3 formed at locations to which distances d1, d2 and d3 from the first end 111 of the supporting portion 110 are different from each other.

Generally, the flat image display apparatus 200 may have a variable size gap between the diffuser plate 80 and the top surface 66 of the bottom portion 61 of the under chassis 60 (hereinafter, referred to as a supporting gap) which changes depending on the screen size thereof. For example, the supporting gap of 40 inch image display apparatus 200 may be smaller than the supporting gap of 46 inch image display apparatus 200. The supporting gap of 46 inch image display apparatus 200 may be smaller than the supporting gap of 55 inch image display apparatus 200.

In the present exemplary embodiment, as illustrated in FIGS. 3, 4 and 5, the base 120 is formed to include three reference surfaces 121-1, 121-2, and 121-3 and three fixing protrusions 123-1, 123-2, and 123-3 so as to support the diffuser plate 80 in 40 inch, 46 inch and 55 inch image display apparatuses.

Figure 8:
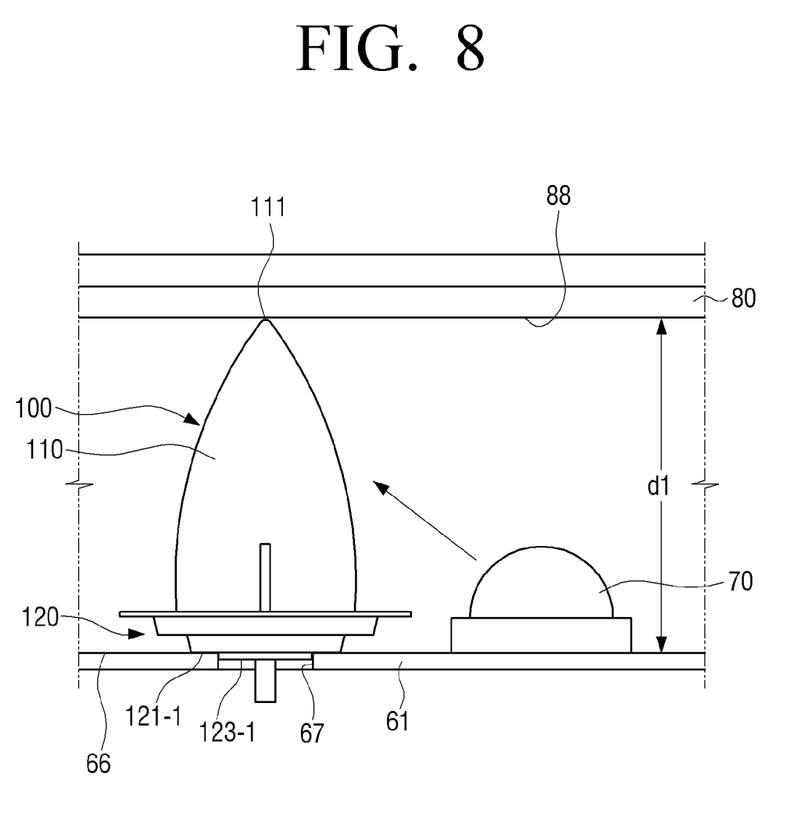
FIG. 8 is a partial sectional view illustrating a supporting member according to an exemplary embodiment supporting a diffuser plate.

A first fixing protrusion 123-1 and a first reference surface 121-1 of the base 120 are for the 55 inch image display apparatus 200. Accordingly, in the case of the 55 inch image display apparatus 200, as illustrated in FIG. 8, the supporting member 100 is disposed so that the first fixing protrusion 123-1 of the base 120 is inserted into the fixing hole 67 of the under chassis 60 and the first reference surface 121-1 of the base 120 is in contact with the top surface 66 of the bottom portion 61 of the under chassis 60.

Figure 9:
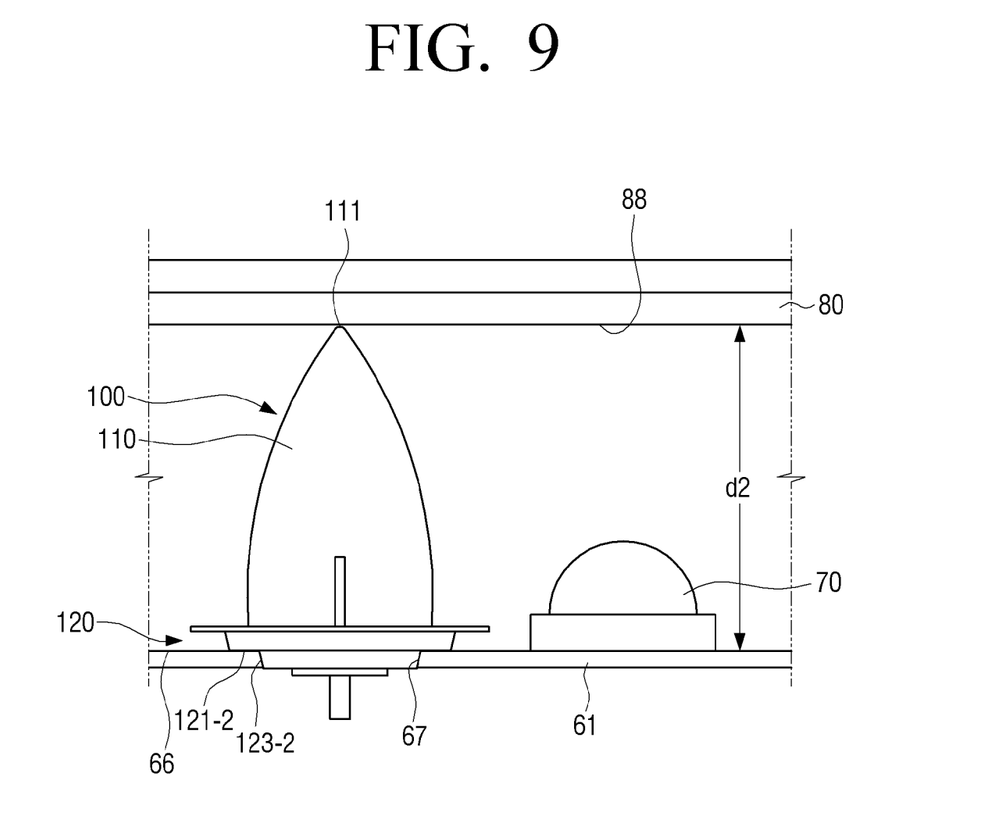
FIG. 9 is a partial sectional view illustrating a diffuser plate disposed at a shorter distance than the diffuser plate of FIG. 8 and supported by the supporting member according to an exemplary embodiment.

With reference to FIG. 9, a second fixing protrusion 123-2 and a second reference surface 121-2 of the base 120 are for the 46 inch image display apparatus 200. Accordingly, the supporting member 100 is disposed so that the second fixing protrusion 123-2 of the base 120 is inserted into the fixing hole 67 of the under chassis 60 of the 46 inch image display apparatus 200 and the second reference surface 121-2 of the base 120 is in contact with the top surface 66 of the bottom portion 61 of the under chassis 60 thereof. Although not illustrated, in the case of the 40 inch image display apparatus 200, the supporting member 100 is disposed so that a third fixing protrusion 123-3 of the base 120 is inserted into the fixing hole 67 of the under chassis 60 of the 40 inch image display apparatus and the third reference surface 121-3 of the base 120 is in contact with the top surface 66 of the bottom portion 61 of the under chassis 60 thereof.

Accordingly, the fixing hole 67 having the size corresponding to anyone among the first, second and third fixing protrusions 123-1, 123-2, and 123-3 depending on the size of the image display apparatus 200 is formed on the bottom portion 61 of the under chassis 60.

The reinforcing portion 130 is disposed on the top surface 132 of the base 120 and is formed to support at least one between the front surface 110a and the rear surface 110b of the supporting portion 110. The reinforcing portion 130 is formed to prevent the thin supporting portion 110 from buckling. The reinforcing portion 130 has a first edge surface 150, which extends substantially perpendicular from the base 120 toward the screen 20, and a first end 134 in contact with the supporting portion 110. The first edge surface 150 is disposed at a lower portion 152 of the supporting portion 110 so that the first end 134 contacts the supporting portion 110 at a point which is substantially lower than a half distance point between the top surface 132 of the base 120 and the first end 111 of the supporting portion 110.

The reinforcing portion 130 further has a second edge surface 153, which is fixed to the base 120 and extends from the first edge surface 150 along the second direction toward an outer periphery of the base to a second end 136 which is disposed at a distance from the supporting portion 110. A third edge surface 154 forms a sloped surface to connect the first end 134 and the second end 136 fixed to the base 120.

Accordingly, as illustrated in FIG. 4, the reinforcing portion 130 may be formed in a triangular shape, as seen in the second direction 142, between the supporting portion 110 and the base 120, with two opposing surfaces 158 formed in a triangular shape and being substantially flat and parallel to one another.

In the present exemplary embodiment, as illustrated in FIGS. 2 and 3, two reinforcing portions 130 are formed to support the front surface 110a and the rear surface 110b of the supporting portion 110. As another example, the reinforcing portion 130 may be formed to support only one between the front surface 110a and the rear surface 110b of the supporting portion 110. The base 120 and the reinforcing portion 130 may be formed of the same transparent material as that of the supporting portion 110.

Figure 10:
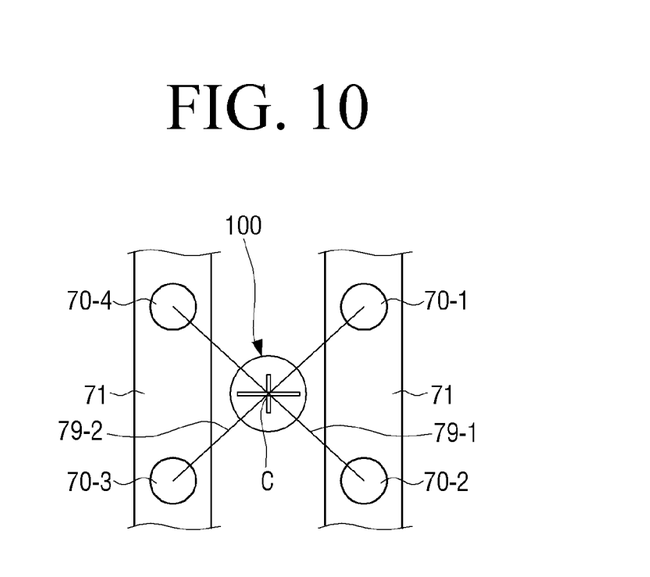
FIG. 10 is a view illustrating a relationship between a supporting member according to an exemplary embodiment and a plurality of light sources.

The supporting member 100 may be disposed at approximately a center point or area of the plurality of surrounding light sources 70 to prevent shadow of the supporting member 100 from being formed by the surrounding light sources 70. In other words, the supporting member 100 may be disposed at the center of a shape formed by the plurality of nearest light sources 70. For example, as illustrated in FIG. 10, when the four nearest light sources 70-1, 70-2, 70-3, and 70-4 are arranged at corner points of a rectangle, the supporting member 100 may be disposed at an intersecting point C of two diagonals 79-1 and 79-2 connecting the four light sources 70-1, 70-2, 70-3, and 70-4.

Also, the supporting member 100 is disposed to support the middle portion of the diffuser plate 80. For example, when two supporting members 100 support the diffuser plate 80, as illustrated in FIG. 11, the two supporting members 100 may be disposed at the center portion of the under chassis 60 corresponding to the middle portion of the diffuser plate 80. For example, each of the supporting members 100 is disposed at approximately the center point between four nearest light sources 70.

As described above, if the supporting member 100 is formed of a transparent material in a thin plate shape, light emitted from the light source 70 passes through the supporting member 100 and interference of light due to the supporting member 100 is minimized so that a shadow of the supporting member 100 can be prevented from being displayed on a screen of an image display apparatus. Accordingly, if the diffuser plate 80 is supported by the supporting member 100 according to an exemplary embodiment, although for cost savings the number of the light sources 70 used in the backlight unit 50 is reduced and the thickness of the diffuser plate 80 is increased, the shadow of the supporting member 100 can be prevented from being displayed on the screen.

Figure 12:
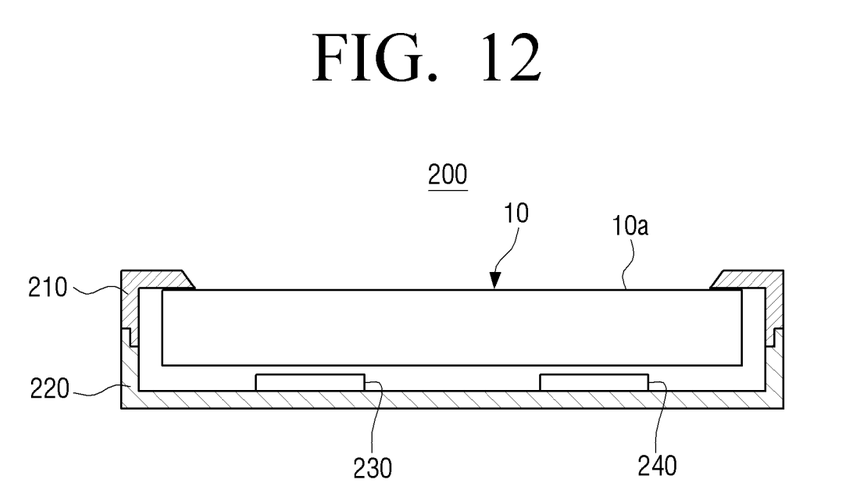
FIG. 12 is a sectional view conceptually illustrating an image display apparatus including a supporting member according to an exemplary embodiment.

FIG. 12 is a sectional view schematically illustrating an image display apparatus 200 according to an exemplary embodiment.

FIG. 12 illustrates a liquid crystal display television as an example of the image display apparatus. However, the present teaching can be applied to other types of image display apparatuses such as a computer monitor, etc.

The image display apparatus 200 includes an upper housing 210 and an under housing 220. The upper and under housings 210 and 220 accommodate the liquid crystal panel assembly 10 according to an exemplary embodiment as described above therein. As described above, the backlight unit 50 of the liquid crystal panel assembly 10 may include at least one supporting member 100 supporting the diffuser plate 80.

A power board 230 to supply power to the image display apparatus 200 and a control board 240 to control operation of the image display apparatus 200 are arranged on the rear side of the liquid crystal panel assembly 10. Although only the power board 230 and the control board 240 are illustrated in FIG. 12, the image display apparatus 200 can additionally include other printed circuit boards for other functions therein.

As described above, since at least one supporting member 100 according to an exemplary embodiment to support the diffuser plate 80 is disposed in the liquid crystal panel assembly 10, the shadow of the supporting member 100 is not displayed on the screen 10a of the image display apparatus 200 of FIG. 12 where the liquid crystal panel assembly 10 is mounted.

While a few embodiments have been shown and described, it will be appreciated by those skilled in the art that changes may be made in the exemplary embodiments without departing from the principles and spirit of the invention, the scope of which is defined in the claims and their equivalents.

What is claimed is:

1. A supporting member usable with a backlight unit of an image display apparatus, the supporting member comprising:
   a supporting portion that is formed of a transparent material, is disposed below a diffuser plate to support the diffuser plate, and comprises:
      a first end being in contact with the diffuser plate,
      two flat side surfaces disposed in parallel to one another and connected to one another at the first end, and
      a first side portion and a second side portion which respectively connect the two flat side surfaces to one another;
   a base that is formed at a second end of the supporting portion and fixes the supporting portion to an under chassis of the backlight unit; and
   a reinforcing portion that is disposed on a top surface of the base,
   wherein the first side portion and the second side portion continuously extend from the top surface of the base to the first end of the supporting member,
   the two flat side surfaces continuously extend between corresponding edges of the first side portion and the second side portion, and
   the reinforcing portion comprises:
      a first edge surface which extends from the top surface of the base along a lower portion of the supporting portion,
      a second edge surface which is fixed to the base and extends from the first edge surface toward an outer periphery of the base, and
      a third edge surface which contacts a point on a surface of least one of the two flat side surfaces at a distance which is lower than a half-distance point between the top surface of the base and the first end of the supporting portion.

2. The supporting member of claim 1, wherein a width of the first end of the supporting portion is narrower than that of the second end.

3. The supporting member of claim 2, wherein the two flat side surfaces connect the first end and the second end of the supporting portion, and
   the corresponding edges of the first side portion and the second side portion are formed in at least one shape among a straight line, a concave curve, a convex curve, and a step shape.

4. The supporting member of claim 1, wherein the first end of the supporting portion is in point contact with the diffuser plate.

5. The supporting member of claim 4, wherein an area of the first end of the supporting portion in contact with the diffuser plate is smaller than 4 $mm^2$.

6. The supporting member of claim 1, wherein a thickness of the supporting portion is less than 2 mm.

7. The supporting member of claim 1, wherein the two flat side surfaces have front sides, respectively, which face toward the outer periphery of the base, and
   the reinforcing portion is formed to support the front sides of the two flat side surfaces.

8. The supporting member of claim 1, wherein the base and the reinforcing portion are formed of a same transparent material as the supporting member.

9. The supporting member of claim 1, wherein the base comprises a fixing protrusion inserted into a fixing hole formed in the under chassis of the backlight unit.

10. The supporting member of claim 9, wherein the base is formed substantially perpendicular to the supporting portion and comprises at least two reference surfaces that have different distances to the first end of the supporting portion.

11. A backlight unit comprising:
    a diffuser plate;
    a fixing member which fixes the diffuser plate;
    an under chassis spaced apart from the diffuser plate;
    a plurality of light sources which is disposed on a top surface of the under chassis and emits light to the diffuser plate; and
    at least one supporting member which is disposed between the plurality of light sources on the top surface of the under chassis and supports the diffuser plate, the at least one supporting member comprises:
       a supporting portion that is formed of a transparent material, is disposed below the diffuser plate to support the diffuser plate, and comprises:
          a first end being in contact with the diffuser plate,
          two flat side surfaces disposed in parallel to one another and connected to one another at the first end, and
          a first side portion and a second side portion which respectively connect the two flat side surfaces to one another;
       a base that is formed at a second end of the supporting portion and fixes the supporting portion to the under chassis of the backlight unit; and
       a reinforcing portion that is disposed on a top surface of the base,
    wherein the first side portion and the second side portion continuously extend from the top surface of the base to the first end of the at least one supporting member,
    the two flat side surfaces continuously extend between corresponding edges of the first side portion and the second side portion, and
    wherein the reinforcing portion comprises:

a first edge surface which extends from the top surface of the base along a lower portion of the supporting portion, a second edge surface which is fixed to the base and extends from the first edge surface toward an outer periphery of the base, and a third edge surface which contacts a point on a surface of least one of the two flat side surfaces at a distance which is lower than a half-distance point between the top surface of the base and the first end of the supporting portion.

12. The backlight unit of claim 11, wherein the at least one supporting member is disposed approximately at a center point between light sources disposed nearest to the at least one supporting member, among the plurality of light sources.

13. An image display apparatus comprising:
a liquid crystal panel; and
a backlight unit which is disposed underneath the liquid crystal panel, and comprises:
a diffuser plate;
a fixing member which fixes the diffuser plate;
an under chassis spaced apart from the diffuser plate;
a plurality of light sources which is disposed on a top surface of the under chassis and emits light to the diffuser plate; and
at least one supporting member which is disposed between the plurality of light sources on the top surface of the under chassis and supports the diffuser plate, the at least one supporting member comprising:
a supporting portion that is formed of a transparent material, is disposed below the diffuser plate to support the diffuser plate, and comprises:
a first end being in contact with the diffuser plate,
two flat side surfaces disposed in parallel to one another and connected to one another at the first end, and
a first side portion and a second side portion which respectively connect the two flat side surfaces to one another;
a base that is formed at a second end of the supporting portion and fixes the supporting portion to the under chassis of the backlight unit; and
a reinforcing portion that is disposed on a top surface of the base,
wherein the first side portion and the second side portion continuously extend from the top surface of the base to the first end of the at least one supporting member,
the two flat side surfaces continuously extend between corresponding edges of the first side portion and the second side portion, and
the reinforcing portion comprises:
a first edge surface which extends from the top surface of the base along a lower portion of the supporting portion,
a second edge surface which is fixed to the base and extends from the first edge surface toward an outer periphery of the base, and
a third edge surface which contacts a point on a surface of least one of the two flat side surfaces at a distance which is lower than a half-distance point between the top surface of the base and the first end of the supporting portion.

* * * * *